US010871995B2

(12) United States Patent
Gerdesmeier et al.

(10) Patent No.: US 10,871,995 B2
(45) Date of Patent: Dec. 22, 2020

(54) MANAGED CONTAINER INSTANCES

(71) Applicant: Amazon Technologies, Inc., Seattle, WA (US)

(72) Inventors: Daniel Robert Gerdesmeier, Seattle, WA (US); Christopher Brian Barclay, Seattle, WA (US); Anthony Joseph Suarez, Seattle, WA (US); Carlos Eduardo Lopez Biagi, Seattle, WA (US); Archana Srikanta, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 125 days.

(21) Appl. No.: 15/280,807

(22) Filed: Sep. 29, 2016

(65) Prior Publication Data
US 2018/0088993 A1 Mar. 29, 2018

(51) Int. Cl.
*G06F 9/455* (2018.01)
*G06F 9/50* (2006.01)

(52) U.S. Cl.
CPC ......... *G06F 9/5005* (2013.01); *G06F 9/5077* (2013.01); *G06F 9/45533* (2013.01)

(58) Field of Classification Search
CPC .............................. G06F 9/5005; G06F 9/5077
See application file for complete search history.

(56) References Cited

U.S. PATENT DOCUMENTS

| 2015/0120928 A1* | 4/2015 | Gummaraju ........ H04L 67/1008 709/226 |
| 2017/0063722 A1* | 3/2017 | Cropper ................. G06F 16/285 |
| 2017/0264684 A1* | 9/2017 | Spillane .............. H04L 67/1095 |
| 2018/0060740 A1* | 3/2018 | Bradley ................. G06N 5/025 |

FOREIGN PATENT DOCUMENTS

| JP | 2013543171 A | 11/2013 |
| WO | 2016077367 A1 | 5/2016 |
| WO | 2016090292 A1 | 6/2016 |
| WO | 2016126731 A1 | 8/2016 |

OTHER PUBLICATIONS

Tihfon et al. An efficient multi-task PaaS cloud infrastructure based on docker and AWS ECS for application deployment. [online] (Jul. 23, 2016), pp. 1585-1597. Retrieved From the Internet <https://link.springer.com/content/pdf/10.1007%2Fs10586-016-0599-0.pdf> (Year: 2016).*

(Continued)

*Primary Examiner* — Emerson C Puente
*Assistant Examiner* — Jonathan R Labud
(74) *Attorney, Agent, or Firm* — Davis Wright Tremaine LLP

(57) ABSTRACT

Techniques for instantiating container instances from a pool of available container instances are described herein. An instance type is determined from a container description such that the instance type satisfies the resource parameters in the container description. An instance of the instance type is selected from a pool of running container instances, the instance is provisioned, and a container is instantiated on the instance.

20 Claims, 11 Drawing Sheets

(56) References Cited

OTHER PUBLICATIONS

Benedicic et al. Opportunities for container environments on Cray XC30 with GPU devices. [online] (Apr. 8, 2016), pp. 1-11. Retrieved From the Internet <https://cug.org/proceedings/cug2016_proceedings/includes/files/pap175s2-file1.pdf> (Year: 2016).*

Wu et al. TotalCOW: Unleash the Power of Copy-On-Write for Thin-provisioned Containers. [online] (Jul. 28, 2015), pp. 1-7. Retrieved From the Internet <http://www.ece.eng.wayne.edu/~sjiang/pubs/papers/wu15-totalcow.pdf> (Year: 2015).*

Ismail et al. Evaluation of Docker as Edge Computing Platform. [online] (Aug. 26, 2015), pp. 130-135. Retrieved From the Internet <https://ieeexplore.ieee.org/stamp/stamp.jsp?tp=&arnumber=7377291> (Year: 2015).*

Muller et al.An Elasticity-aware Governance Platform for Cloud Service Delivery. [online] (Jul. 2, 2016), pp. 74-81. Retrieved From the Internet <http://www.infosys.tuwien.ac.at/staff/sd/papers/SCC_2016_L_Truong.pdf> (Year: 2016).*

Spillane et al. Exo-clones: Better Container Runtime Image Management across the Clouds. [online] (Jun. 21, 2016), pp. 1-5. Retrieved From the Internet <https://www.usenix.org/system/files/conference/hotstorage16/hotstorage16_spillane.pdf> (Year: 2016).*

Jellema, Lucas. Vagrant and Docker—Next and Advanced steps with folders, ports, volumes, linking and more. [online] AMIS., pp. 1-13. Retrieved From the Internet <https://technology.amis.nl/2015/08/25/vagrant-and-docker-next-and-advanced-steps-with-folders-ports-volumes-linking-and-mor> (Year: 2015).*

International Search Report and Written Opinion dated Jan. 3, 2018, International Patent Application No. PCT/US2017/054489, filed Sep. 29, 2017, 15 pages.

Australian Examination Report No. 1 dated Sep. 27, 2019, Patent Application No. 2017337061, filed Sep. 29, 2017, 5 pages.

Australian Notice of Acceptance dated Feb. 27, 2020, Patent Application No. 2017337061, filed Sep. 29, 2017, 3 pages.

Japanese Notice of Reasons for Refusal dated Mar. 10, 2020, Patent Application No. 2019-516173, filed Sep. 29, 2017, 3 pages.

* cited by examiner

MANAGED CONTAINER INSTANCES

BACKGROUND

Modern computer systems are frequently implemented as distributed collections of computer systems operating collectively within one or more host computer system environments. As part of this implementation, software containers, which are lightweight, virtualized execution environments for applications are frequently used. Containers allows for easily running and managing applications across a cluster of servers or virtual machines. Applications packaged as containers can be deployed across a variety of environments, such as locally and within a compute service. Compute services may provision virtual machines to host containers on behalf of customers thereby eliminating the need to install, operate, and scale a cluster management infrastructure.

BRIEF DESCRIPTION OF THE DRAWINGS

Various techniques will be described with reference to the drawings, in which.

DETAILED DESCRIPTION

Figure 1:
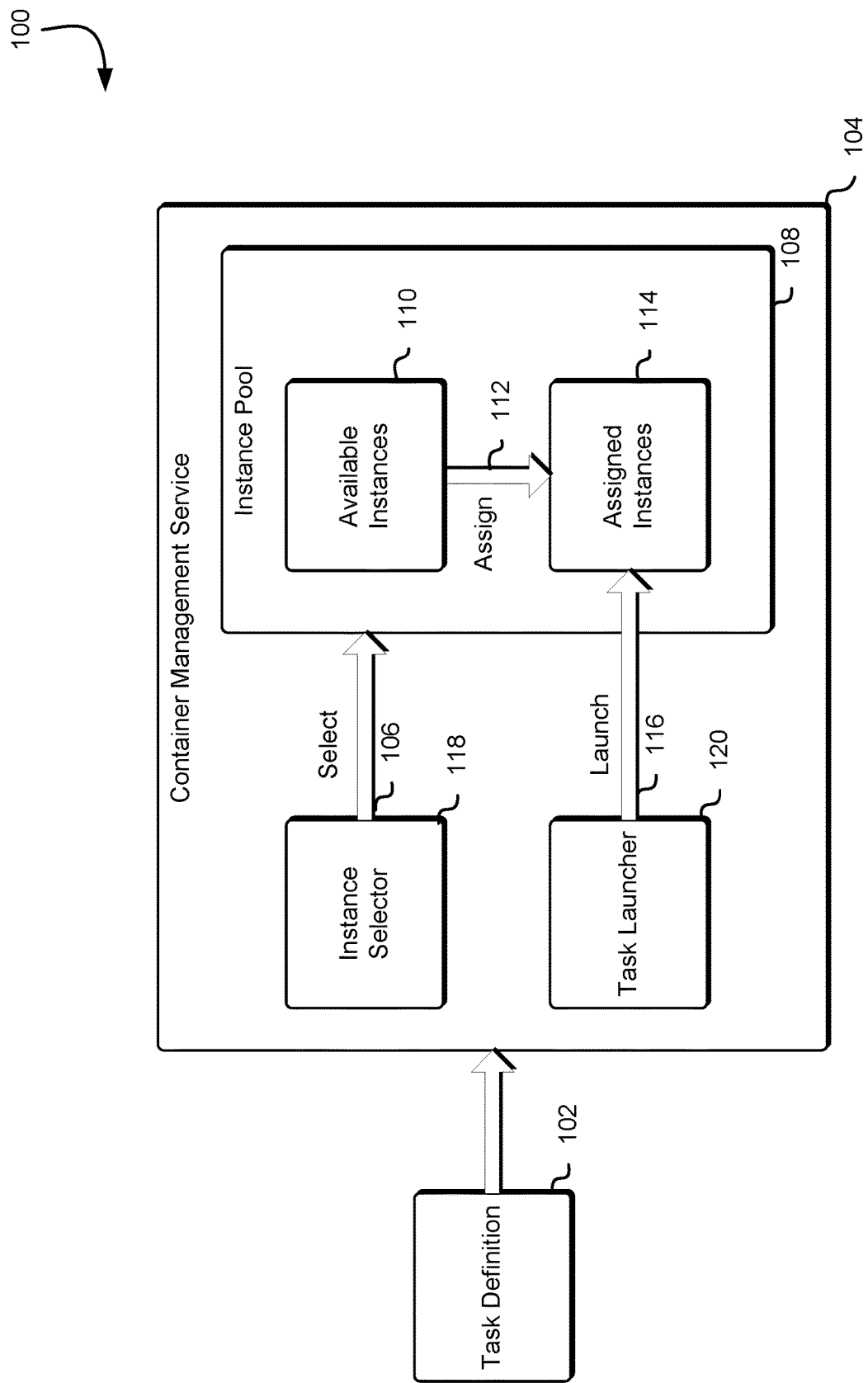
FIG. 1 illustrates an example environment where container instances are managed using a container management service.

The following disclosure describes techniques for managing container instances (i.e., virtual machine instances used to host containers) using a container management service. A customer of a computing resource services provider that provides access to computation services may describe a task to be performed using a set of software containers. These software containers, also referred to simply as "containers" are lightweight, virtualized execution environments for applications that wrap an application in its own complete file system that contains everything needed to run the application, including the software, files, and system libraries. A container management application in turn allocates resources of an operating system to run the container.

As described above, a task can be specified with one or more containers that execute applications to perform the task. For example, a customer of a computing resource service provider may specify a task with a content management application running in one container and a database application running in another container. Each of these applications execute in concert so that, for example, the content management application accesses the database to determine and locate the resources needed. The task, when executed, starts up the two containers with the applications installed and uses the containers to, for example, update a web page (i.e., the content management application checks for updated content using the database and, if new content is found, updates a web page).

When a task is specified, the customer of the computing resource service provider specifies a number of parameters for performing the task, including a number of central processing units ("CPU"s) that are needed, the amount of each CPU that is required, the amount of memory that is required, and networking parameters. The customer of the computing resource service provider may also specify locations (or "zones") where the task should be executed, request additional resources associated with the task such as, for example, scratch storage, logging, or security parameters.

When the execution of a task is requested by a customer of a computing resource service provider, a computer system instance (e.g., a virtual machine) is provided to the customer where the containers may be instantiated and executed. The techniques for managing these computer system instances to improve the efficiency of providing the computer system instances are described in this disclosure.

When a container management service receives a task definition from a customer of a computing resource service provider, the container management service analyzes the task definition to determine the best container instance to use to execute the task. Based on the parameters specified in the task definition, a container instance with sufficient capabilities is chosen from a set of container instances. So, for example, if the webpage update task definition described above, with a content management container and a database container, includes parameters requesting two CPUs, four gigabytes ("GB") of memory, network connectivity (i.e., the ability to connect to a network), and a network connection with a minimum bandwidth, then a container instance with at least these capabilities can be selected by the container management service to perform the task.

Although an instance with the set of capabilities could be created as needed (i.e., "on the fly"), in the techniques described in this disclosure, the container management service instead maintains a pool of running container instances that can be assigned to a customer for performing a task, and then returned to the pool. Each of the different types of container instances (i.e., a container instance having a set of capabilities) can have multiple instances already instantiated and running, and as task definitions are received, a running instance from the pool is selected based on the parameters of the task.

At any one time, the number of container instances of a particular type may be running and available in the pool. For example, the container management service may have five different types of container instances available, labeled "A," "B," "C," "D," and "E" where "A" has the least capabilities and "E" has the most. If a task definition is received that can run on a container instance "B," then a container instance of type "B" can be selected from the pool and provided to run the task for the customer of the computing resource service provider. It should be noted that a task can require multiple instances and, for such a task, multiple container instances of multiple different types can be selected from the pool.

The pool of container instances initially contains multiple instances of each type. However, as container instances are assigned to customers of the computing resource service provider, one or more types of instances may become scarce or unavailable. For example, if there are one-hundred type "B" instances and ninety-five are in use, a task that requires ten type "B" instances might fail. In order to avoid the task failing, the container management service might look for an instance type that is equivalent (i.e., that has the same CPU, network, and memory parameters, but that might have additional resources associated with the instance) and provide instances of that type instead. Similarly, the container management service might look for a better instance type (i.e., one that has capabilities that exceed the parameters, such as, in the example described, a type "C," type "D," or type "E" container instance). An instance type may be selected if the instance type has a set of performance characteristics that satisfy the set of parameters for instantiating the container on an instance of the instance type where the performance characteristics include, but are not limited to, memory, CPU, and network bandwidth. Additionally, when instances of a particular type become scarce (or unavailable), the container management service may alleviate this scarcity by instantiating additional instances in the instance pool.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where container instances are managed using a container management service in accordance with an embodiment. In the example illustrated in FIG. 1, a task definition 102 is received at a container management service 104. The task definition 102 is, in an embodiment, a file specifying a set of linked containers (i.e., a set of containers that, when running on a host computing system, are associated with each other) that are assigned to start as a group. The task definition 102 may specify disk and network locations that the containers associated with the task are able to share on a single physical machine. The task definition 102 may then be utilized for launching the containers associated with the task. The task definition 102 may define and link containers that are distributed to multiple physical hosts. One task definition 102 may contain and schedule many tasks. In some examples, a "task" may refer to an instantiation of the resources specified by the task definition 102, and may include one or more containers. Tasks may be modified by applying a new task definition to the task.

As described above, the task definition 102 specifies the information needed to instantiate containers associated with the task. The task definition 102 specifies the information needed to instantiate containers associated with the task as, for example, a set of resource parameters (e.g., a CPU specification, a memory specification, a network specification, and/or a hardware specification) as described below. The task definition 102 may also specify the information needed to instantiate containers associated with the task as a container image (i.e., an image or snapshot of a previously instantiate container or as an image specification (i.e., a description of an image that may be used to instantiate an image). An image specification and/or an image may be specified by the customer of the computing resource services provider, specified by the computing resource services provider, or specified by some other entity (e.g., a third-party). The task definition 102 may instantiate the containers in a cluster or group that provides isolation of the instances and/or the tasks. The containers and the isolation may be managed through application programming interface ("API") calls as described herein.

An example of a task definition may be:

```
{ 'db' :
    {
        'Image' : 'postgresql',
        'CPU' : 1000,
        'Memory' : 1073741824
    },
    'cms' :
    {
        'Image' : 'content_manager',
        'links' : ['db'],
        'CPU' : 1000,
        'Memory' : 1073741824
    }
}
```

The example task definition specifies that a first task, entitled "db," has a software image located at the path "postgresql." The first task is allocated processing shares of one-thousand and one GB of memory by a container management service 104. Similarly, the task definition also specifies that a second task, entitled "cms," has a software image located at the path "content_manager." The second task is also allocated processing shares of one-thousand and one GB of memory by a container management service 104. The task definition notes that the second task ("cms") is allowed to link to the first task ("db"). Note that while some units used in this example are given as a fixed number, such as the processing capacity given as a fixed number of central processing unit shares, it is contemplated that other units and other types of values (e.g., percentages of total processing capacity, percentages of total memory) could be used instead to allow for dynamic resource allocation.

The container management service 104 is may be a collection of computing resources that operate collectively to process task definitions to perform tasks as described herein by providing and managing container instances where the tasks and the associated containers can be executed. The computing resources configured to process task definitions and provide and manage container instances where the tasks and the associated containers can be executed include at least one of: computer systems (the computer systems including processors and memory), networks, storage devices, executable code, services, processes, modules, or applications. The computing resources configured to process task definitions and provide and manage container instances where the tasks and the associated containers can be executed may include virtual systems that are implemented on shared hardware hosted by, for example, a computing resource service provider. The container management service 104 may be implemented as a single system or may be implemented as a distributed system, with a plurality of instances operating collectively to process task definitions and provide and manage container instances where the tasks and the associated containers can be executed. The container management service 104 may operate using computing resources (e.g., other services) that enable the container management service 104 to receive task definitions, instantiate container instances, communicate with container instances, and/or otherwise manage container instances.

The container management service 104 may be a service provided by a computing resource service provider to allow a customer of the computing resource service provider to execute tasks using containers on container instances as described below. The computing resource service provider may be a computing resource service provider similar to the computing resource service provider 210, described in connection with FIG. 2, and may provide one or more computing resource services to its customers individually or as a combination of services of a distributed computer system. The one or more computing resource services of the computing resource service provider may be accessible over a network and may include services such as virtual computer system services, block-level data storage services, cryptography services, on-demand data storage services, notification services, authentication services, policy management services, task services, and/or other such services. Not all embodiments described include all of the services described and additional services may be provided in addition to, or as an alternative to, services explicitly described.

As one example, the computing resource service provider may be an entity that provides computing resources, such as data storage services, virtual computer system services, and/or web services. Customers of the computing resource service provider may communicate with one or more of the services via an interface, which may be a web services interface or any other type of customer interface. Each service provided by a computing resource service provider may have its own interface and subsets of the services may have corresponding individual interfaces in addition to, or as an alternative to, a common interface.

In some examples, a container instance (also referred to herein as a "software container instance") may refer to a computer system instance (virtual or non-virtual, such as a physical computer system running an operating system) that is configured to launch and run software containers. Thus, the container instance may be configured to run tasks in containers in accordance with the task definition provided by the customer. One or more container instances may comprise an isolated cluster or group of containers. In some examples, "cluster" may refer to a set of one or more container instances that have been registered to (i.e., as being associated with) the cluster. Thus, a container instance may be one of many different container instances registered to the cluster, and other container instances of the cluster may be configured to run the same or different types of containers. The container instances within the cluster may be of different instance types or of the same instance type. A customer of a computing resource service provider may have more than one cluster. Thus, the customer may launch one or more clusters and then manage user and application isolation of the containers within each cluster through application programming interface calls.

A container (also referred to as a "software container") may be a lightweight virtual machine instance running under a computer system instance that includes programs, data, and system libraries. When the container is run (or executed), the running program (i.e., the process) is isolated from other processes running in the same computer system instance. Thus, containers may each run on an operating system (e.g., using memory, CPU, and storage allocated by the operating system) of the container instance and execute in isolation from each other (e.g., each container may have an isolated view of the file system of the operating system).

Each of the containers may have its own namespace, and applications running within the containers are isolated by only having access to resources available within the container namespace. Thus, containers may be an effective way to run one or more single applications within their own namespace. A container encapsulation system allows one or more containers to run within a single operating instance without overhead associated with starting and maintaining virtual machines for running separate user space instances.

The containers may be launched to have only specified resources from resources allocated to the container instance; that is, a container may be launched to have a certain amount of memory and to not utilize more than a specified amount of processing power. For example, a task definition 102 may specify two CPUs, but that the container for an application cannot exceed 50% of those two CPUs. The resource allocation for the containers may be specified in the task definition 102. Multiple containers may run simultaneously on a single host computer or host container instance, and the resources of the host can be allocated efficiently between the containers using this system. In an embodiment, a host supports running containers in container instances from only one customer (referred to herein as a "single-tenant" environment). In other embodiments, a single host may allow multiple customers to have container instances running on the host (referred to herein as a "multi-tenant" environment). In the latter case, the container service may provide security to ensure that the customers are unable to access containers, clusters, or container instances of the others.

Different types of tasks may have different resource parameters and may have different lifespans. Thus, containers may be dynamically scheduled to run by a scheduler service independent of an underlying operating system of the container instance, and as such, the underlying operating system of a container instance may be very basic. Alternatively, containers may be scheduled to run by a scheduler installed on the container instance.

When the container management service 104 receives the task definition 102, the instance selector program 118 of the container management service 104 may then select instances 106 from the running instances in an instance pool 108 by selecting one from a database. The instance pool 108 contains a number of running instances (also referred to herein as "running instances") which may be of multiple different instance types. The instance types are types by capabilities provided by the instance. So, for example, a first instance type may be type "A" with two CPUs, four GB of memory, and a gigabit network interface. The instance pool 108 may have tens, hundreds, or thousands of running instances of type "A" already running and available. A second instance type may be type "B" with four CPUs, eight GB of memory, and a gigabit network interface. The instance pool 108 may also have tens, hundreds, or thousands of running instances of type "B" instances already running and available.

The instance selector program 118 of the container management service 104 will select instances 106 from the available instances 110 of the instance pool 108. Available instances 110 are instances that are available to host containers for a customer of the computing resource service provider. Available instances 110 are instances of the specified type that have no containers running thereon, instances that have no containers from other customers running thereon (in a single-tenant environment) and that have sufficient resources available to host containers for the task, or are instances that may have containers from other customers running thereon (in a multi-tenant environment) but that have sufficient resources available to host containers for the task. As instances are assigned to a customer, the instances may be removed from the available instances 110 in the instance pool 108. As instances are released by a customer when, for example, the instance is terminated, the instances may be returned to the available instances 110 in the instance pool 108. As described above, instances that are partially assigned may also be in the available instances 110.

The container management service 104 will select the instance 106 from the available instances 110 of the instance pool 108 based on the task definition 102, as described herein. For example, the task definition 102 may specify a set of parameters that define resources that may be used to instantiate a container on the instance and perform the task specified in the task definition (e.g., a number of CPUs, an amount of memory, an amount of network bandwidth, the presence of specialized hardware, etc.).

In an embodiment, the container management service 104 can analyze the task definition and, as a result of this analysis, can determine that that the set of parameters that define the resources would result in an instance type being selected that would be underprovisioned to instantiate the container. For example, the task definition 102 could specify in inadequate amount of memory for the task or not specify a network interface for the task. In such an embodiment, the container management service 104 can select the instance 106 from the available instances 110 of the instance pool 108 based on a second set of parameters, where one or more of the second set of parameters is different than one or more of the parameters of the task definition 102 (e.g., would result in selecting an improved instance type with more resources and/or capabilities than the instance type specified in the task definition 102).

For example, the task definition 102 may specify that two GB of memory is needed for the task and the container management service 104 may analyze the task and determine that four GB of memory is needed for the task. In this example, the container management service 104 can select the instance 106 from the available instances 110 of the instance pool 108 based on a second set of parameters that include the set of parameters in the task description, but with the two GB parameter replaced with a four GB parameter. Other examples of parameters that may be different than the parameters specified in the task definition 102 include, but are not limited to, additional CPUs, different CPU types, higher CPU percentages, more network bandwidth, lower latency, additional storage, different storage types, or specialized hardware.

In an embodiment, the container management service 104 can analyze the task definition and, as a result of this analysis, can determine that that the set of parameters that define the resources would result in an instance type being selected that would be overprovisioned to instantiate the container. In such an embodiment, the container management service 104 can select the instance 106 from the available instances 110 of the instance pool 108 based on a second set of parameters, where one or more of the second set of parameters is different than one or more of the parameters of the task definition 102 (e.g., would result in selecting an instance type with less resources and/or capabilities than the instance type specified in the task definition 102). For example, the task definition 102 may specify that four GB of memory is needed for the task and the container management service 104 may analyze the task and determine that two GB of memory is needed for the task. In this example, the container management service 104 can select the instance 106 from the available instances 110 of the instance pool 108 based on a second set of parameters that include the set of parameters in the task description, but with the four GB parameter replaced with a two GB parameter. The example parameters described above may also be used in this embodiment (e.g., fewer CPUs, different CPU types, lower CPU percentages, less network bandwidth, higher latency, less storage, different storage types, or the removal of specialized hardware).

Once the selected instances are identified, the container management service 104 may assign 112 the instances to the customer and, based on the task definition 102, a task launcher component 120 of the container management service may launch the task 116 (i.e., launch containers for the task) on the assigned instances 114, as described herein.

Figure 2:
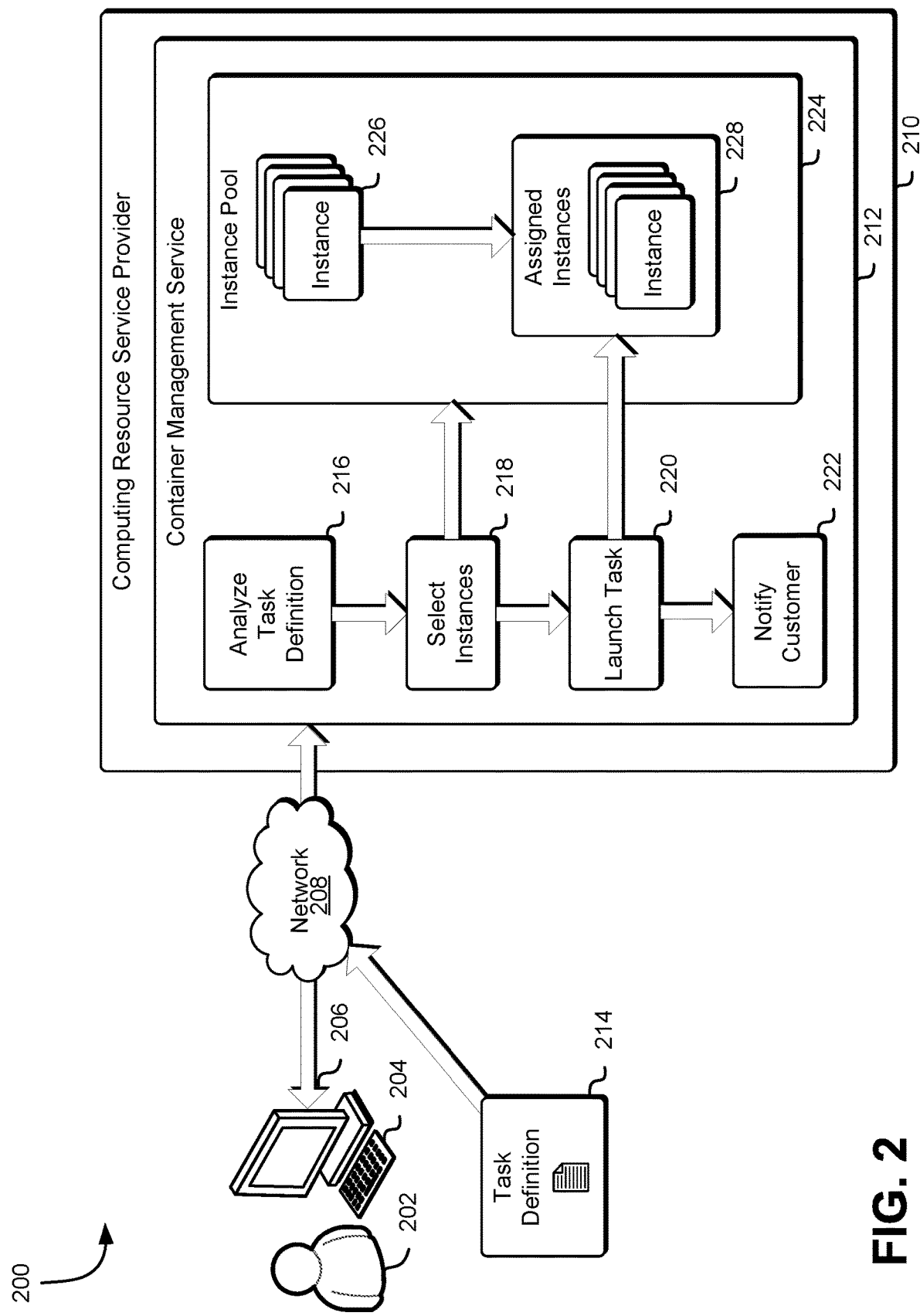
FIG. 2 illustrates an example environment where container instances are instantiated and provisioned using a container management service.

FIG. 2 illustrates an example environment 200 where container instances are instantiated and provisioned using a container management service, as described in connection with FIG. 1, and in accordance with an embodiment. In the example environment 200 illustrated in FIG. 2, a user 202 may use a client computing device 204 to connect 206 to a variety of services provided by a computing resource service provider 210. The user 202 may use the client computing device 204 to connect 206 to the computing resource service provider 210 over a network 208 such as those networks described herein. The computing resource service provider 210 may provide a distributed, virtualized, and/or datacenter environment within which one or more applications, processes, services, virtual machines, and/or other such computer system entities may be executed. The user 202 may be a person, or may be a process running on one or more remote computer systems, or may be some other computer system entity, user, or process.

Commands from the user 202 to the computing resource service provider 210 may originate from an outside computer system or from within the computing resource service provider environment. The commands to connect 206 to the computing resource service provider 210 may be sent to the computing resource service provider 210 and/or the services operating in the environment therein, without the direct intervention of the user 202 (i.e., commands to connect 206 to the computing resource service provider 210 may be generated automatically in response to one or more events). The user 202 may be a privileged user associated with a customer of the computing resource service provider 210. The user 202 may also be a privileged user associated with the computing resource service provider 210.

The computing resource service provider 210 may provide access to one or more host machines, may provide access to one or more virtual machine instances as may be operating thereon, or may provide access to one or more services in an environment therein. The one or more services provided by the computing resource service provider 210 may also be implemented as and/or may utilize one or more virtual machine instances as may be operating on host machines operating within the computing resource service provider 210 environment. For example, the computing resource service provider 210 may provide a variety of services to users including, but not limited to, the user 202 and the users may communicate with the computing resource service provider 210 via an interface such as a web services interface or any other type of interface. While the example environment illustrated in FIG. 2 shows a single connection or interface to the computing resource service provider 210, each of the services operating in an environment therein may have its own interface and, generally, subsets of the services may have corresponding interfaces in addition to or as an alternative to the single interface.

In an example of a type of service operating within the environment of the computing resource service provider 210, a virtual computer system service may be a collection of computing resources configured to instantiate virtual machine instances on behalf of a customer such as the user 202. The customer may interact with a virtual computer system service (via appropriately configured and authenticated API requests) to provision and operate virtual machine instances that are instantiated on physical computing devices hosted and operated by the computing resource service provider 210. The virtual computer system service may provision the instance by instantiating the instance, configuring the instance, and providing resources to run the instance. The virtual computer system service may also be configured to manage virtual machine instances to, for example, instantiate virtual machine instances and/or to manage the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

As described above, a container management service 212 of a computing resource service provider 210 may first receive a task definition 214 that, in the example illustrated in FIG. 2, is provided by the user 202 using the client computing device 204 used to connect 206 to the computing resource service provider 210 over a network 208. The container management service 212 may first analyze the task definition 216 as described herein and, as a result of that analysis, may select instances 218 to use to execute the task, based at least in part on the task definition 214. The instances that the container management service 212 selects are instances that are in an instance pool 224. The instance pool 224 contains a number of available instances 226 of a number of different instance types, as described above.

The selected instances are then assigned to the task (also referred to herein as being assigned to the user 202) by the container management service 212. The container management service 212 then uses the assigned instances 228 to launch the tasks 220 (i.e., to instantiate the containers of the task definition 214 on the assigned instances 228). Finally, the container management service 212 may notify 222 the user 202 of the status of the task, including updating the user 202 as the status changes. In an embodiment, the notification includes access to the task and/or the containers using, for example, a uniform resource locator ("URI") and/or a web interface.

Figure 3:
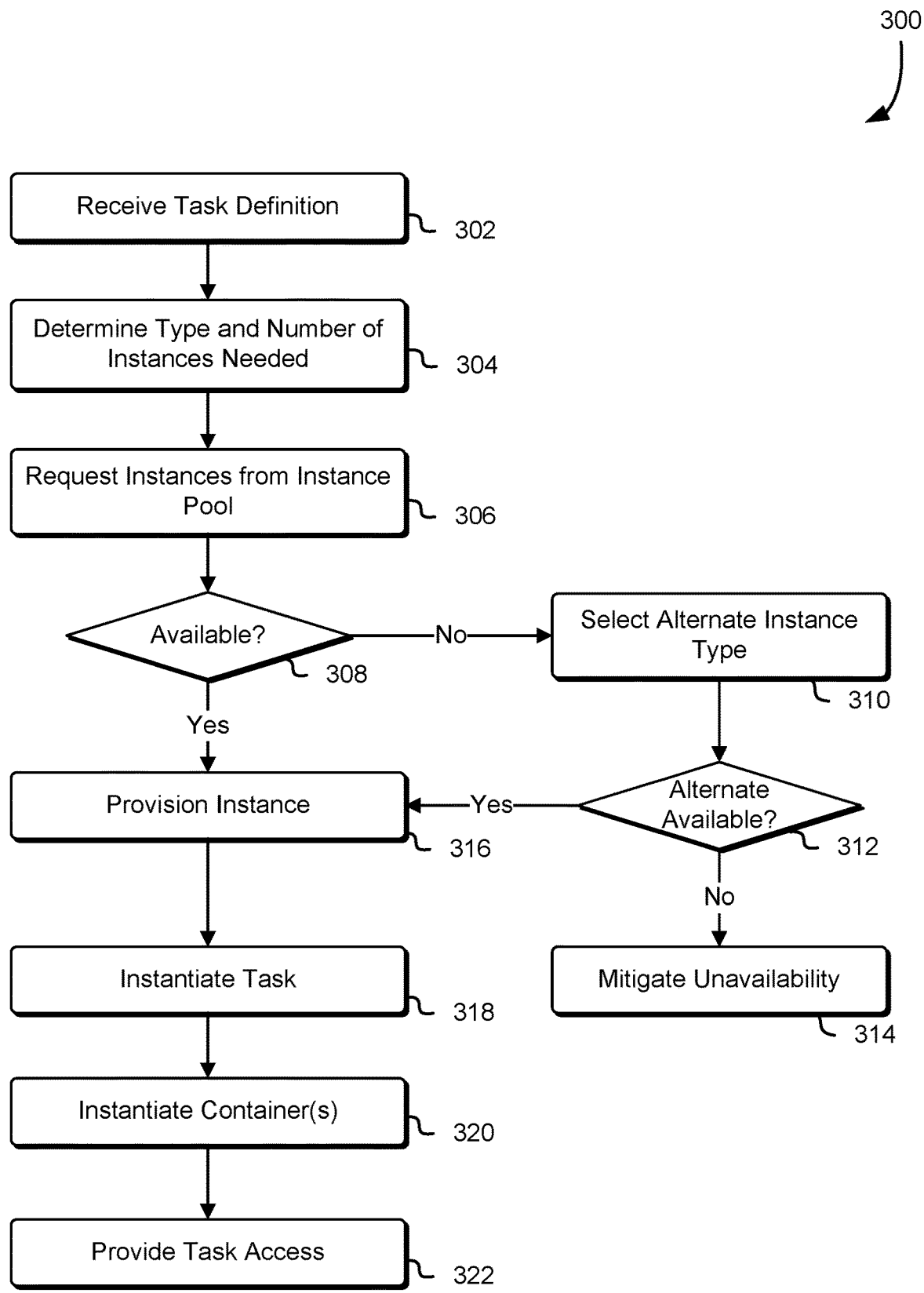
FIG. 3 illustrates an example process for selecting and instantiating container instances using a container management service.

FIG. 3 illustrates an example process 300 for selecting and instantiating container instances using a container management service, as described in connection with FIG. 1, and in accordance with an embodiment. A container management service, such as the container management service 104 described in connection with FIG. 1, may perform the example process 300 illustrated in FIG. 3. The container management service may first receive 302 a task definition, as described above, and may then determine 304 the type and number of instances needed to execute the task.

The container management service may determine 304 the type and number of instances needed to execute the task by, for example, reading the requirements from the task definition, searching for an instance type that satisfies those requirements, and selecting an instance that matches that instance type. If more than one instance type matches the requirements, the container management service may select the instance type based on one or more instance ranking criteria of the instance types such as, for example, the least expensive instance, or the one with the lowest capability that still satisfies the requirement, or according to some other ranking criteria, such as a customer profile indicating a preference. The container management service may also determine 304 the type and number of instances needed to execute the task by filtering available instance types by the requirements, starting with, for example, all instance types and eliminating those types that do not satisfy the requirements. Then, the instance types that satisfy the requirements may be ranked according to the one or more instance ranking criteria.

For example, a best-fit algorithm can be used to match characteristics of a task definition to characteristics of instance types. The algorithm can be tuned so that the container management service attempts to identify a container instance that satisfies all the requirements of the task definition (i.e., has enough memory, storage, networking, CPU, etc.). In an embodiment the amount of excess resources can also be computed and used to select an instance. For example, the container management service can quantify each capability of an instance type and each capability explicitly or implicitly defined in the task definition, can compute the difference between the two, and can compute an area. A smaller area means a better match between the instance type and the requirements for the task. The container management service can then be programmed to select the instance type that satisfies requirements and is the closest match, or in other configurations the container management service can be programmed to select an instance type that has more of one or more types of capabilities then the best fit. Machine learning techniques, feedback from customers, or experimentation by the service provider can be used to tune the selection process over time to adjust how the selection operation is performed for certain kinds of tasks. For example, certain kinds of instance types can be weighted if the type of task can be inferred from the task definition over runs of the same or similar tasks.

The type and number of instances needed to execute the task can be determined from a set of performance specifications for the instance associated with the task definition, as described above. The set of performance specifications for the instance may be obtained by analyzing a set of parameters obtained from the task definition, as described above. For example, a task definition may specify eight containers and each container may require 50% of two CPUs and two GB of memory to execute. From this set of parameters for the task, the task definition requires instances that can provide eight CPUs and sixteen GB of memory to instantiate the eight containers. This set of resources can be provided by a single instance with at least eight CPUs and sixteen GB of memory, or by two instances with at least four CPUs and eight GB of memory each, or by four instances with at least two CPUs and four GB of memory each, or by a combination of instances (e.g., one instance with four CPUs and eight GB of memory and two instances with two CPUs and four GB of memory).

The set of performance specifications for the instance may include a CPU specification for the instance (e.g., that the instance requires 50% of two CPUs to operate), which may be obtained by analyzing the task definition. The set of performance specifications for the instance may also include a memory specification for the instance (e.g., that the instance requires two GB of memory to execute), which may also be obtained by analyzing the task definition. The set of performance specifications for the instance may also include a network bandwidth specification for the instance (e.g., that the instance a gigabit network to execute), which may also be obtained by analyzing the task definition.

The set of performance specifications for the instance may also include one or more requirements for the instance, which may specify one or more additional hardware capabilities for the instance including, but not limited to, additional hardware. For example, the set of performance specifications for the instance may include a hardware requirement that is a field-programmable gate array requirement. A field-programmable gate array requirement is a hardware requirement that a field-programmable gate array be part of a hardware specification for the instance and that the field-programmable gate array be made available to the container instantiated on the instance for the task. In another example, the set of performance specifications for the instance may include a hardware requirement that is an application-specific integrated circuit requirement, specifying that an application-specific integrated circuit be made available to the container instantiated on the instance for the task. In yet another example, the set of performance specifications for the instance may include a hardware requirement that is a hardware security module requirement, or a graphics processing unit requirement, or a memory requirement (e.g., flash memory), or a hardware requirement for some other type of dedicated hardware. As may be contemplated, the examples of requirements for the instance described herein are merely illustrative examples and, as such, other types of requirements for the instance may be considered as within the scope of the present disclosure.

The container management service may next request 306 instances of the type and number from the instance pool. If the container management service does determine 308 that the requested instances are available, the container management service then provisions 316 the instances, instantiate 318 the task on the instances, instantiate 320 the containers on the instances, and provide 322 task access to the customer, all as described in detail herein.

If the container management service does not determine 308 that the requested instances are available, the container management service may try to select 310 an alternate instance type by, for example, iterating through additional instance type and determining whether those additional instance types to determine whether instances of the additional instance type has sufficient resources. For example, an alternate instance type may be selected if the alternate instance type has sufficient resources to run the container associated with the task but the alternate instance type is differently configured (i.e., if the alternate instance type has a set of performance characteristics that satisfy the set of parameters specified for instantiating the container. One example of an alternate instance type is an instance with greater capabilities (e.g., more memory, more or more powerful CPUs, greater network bandwidth, or additional resources) than the original requested instance type. If the container management service does determine 312 that an alternate instance type is available, the container management service then provisions 316 the instances, instantiate 318 the task on the instances, instantiate 320 the containers on the instances, and provide 322 task access to the customer, all as described in detail herein. Conversely, if the container management service does not determine 312 that an alternate instance type is available, the container management service may perform 314 one or more mitigation operations related to the unavailability including, but not limited to, reporting that there are no available instances to run the task. In an embodiment, the container management service may perform one or more mitigation operations related to the unavailability by instantiating additional instances of the requested type, adding those additional instances to the instance pool, and using those newly instantiated additional instances to execute the task.

Figure 4:
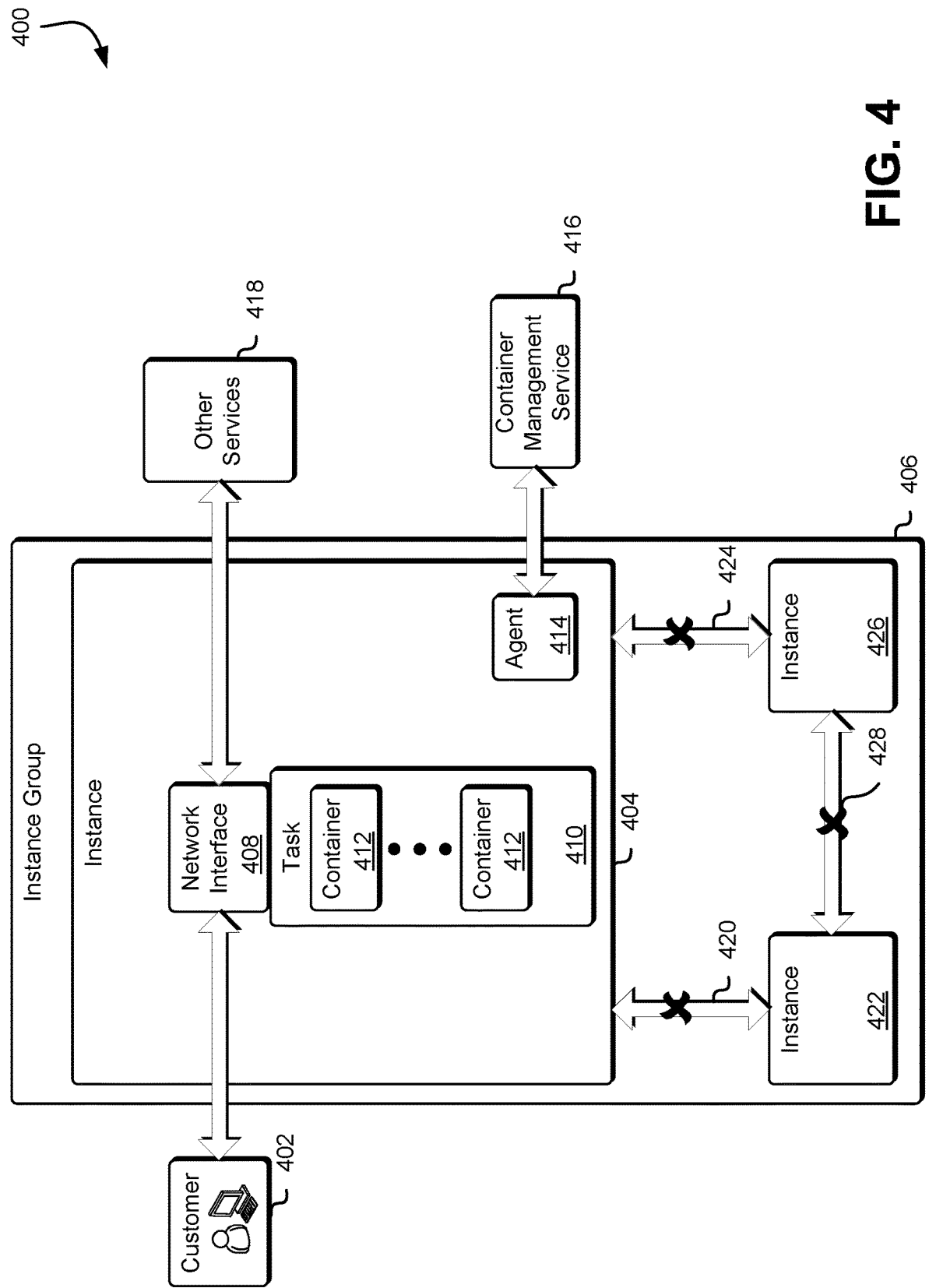
FIG. 4 illustrates an example environment where container instances are isolated from each other.

FIG. 4 illustrates an example environment 400 where container instances are isolated from each other, as described in connection with FIG. 1, and in accordance with an embodiment. In the example illustrated in FIG. 4, a customer 402 of a computing resource service provider has sent a task definition, as described above, and has been provided several instances that are running the task specified by the task definition. The four instances are in an instance group 406, which is a group or cluster of instances, providing isolation of the instances, as described above. An instance 404 of the instance group 406 has a network interface 408 to a task 410. The network interface 408 can be established when the instance 404 is provisioned (i.e., when the service provisions the instance) to execute the task 410. The network interface 408 can be used by the customer 402 to communicate with the task (e.g., to monitor the status of the task and/or to receive results), to communicate between the task and one or more services of the computing resource service provider, or to connect the instance to a virtual network of the customer. In an embodiment, the virtual network of the customer is a virtual private network, provided to the customer by the computing resource services provider and isolated from the virtual private networks of other customers of the computing resource services provider. The task 410 contains one or more containers 412, which were instantiated with the task 410 when the task 410 was started on the instance 404, as described above.

In the example illustrated in FIG. 4, the instance 404 has an agent 414 running thereon which, for example, reports the status of the task 410 to the container management service. A container management service 416 may also use the agent 414 to monitor the instance 404 to gather one or more health metrics for the instance (i.e., to determine potential hardware and/or software issues), to update the instance 404 or software running thereon, to communicate with the customer 402, or to perform and/or provide other services related to the functionality of the instance. In an embodiment, the agent 414 can monitor the instance and/or the tasks running thereon to determine costs associated with running the tasks. For example, an agent 414 can monitor the CPU and memory of the instance and determine, over the course of the task execution, which resources and what amount of those resources are used. For example, the agent 414 can monitor the CPU and memory to determine resource usage metrics for the task (e.g., what amount of memory and CPU is used by the task). These resource usage metrics can then be used to determine a resource cost associated with a container or with the task. This resource cost may then be apportioned to the customer based on actual resources used for the tasks. Thus, a task that requires more CPU time or more memory may cost less to execute than a task that requires less CPU time or less memory.

A customer may also specify pricing models in the task definition so that, for example, the customer can specify completion by a certain time, a "not to exceed" value, a priority for the task (e.g., lower priority tasks might be executed during off hours) and so on. For example, additional resources provided by a computing resource services provider environment may have a cost associated with the resource (e.g., a cost per second of CPU time, cost per megabyte ("MB") of memory used, or a cost to use networking bandwidth). The computing resource services provider can monitor such resource usage for a customer, and can also monitor resources provided to the customer to instantiate container instances to host containers by, for example, using an agent on the instance to monitor the resource usage. A customer can specify a pricing model in the task definition that specifies that any resources can be used to instantiate the containers, provided that such resources do not exceed a fixed cost, or a cost per hour, or according to some other cost specification. Similarly, the customer can specify that the task can be delayed to, for example, run within the next several days, to take advantage of lower resource costs that may exist during off-peak hours for the computing resource services provider. As described above, the task 410 may also specify a request for resources and/or provide resources to other services 418 operating within the computing resource service provider environment. For example, the task may communicate with a database service, or a block storage service, or some other service via the network interface 408 and request resources from those other services 418. These other services 418 and/or the cost limits of these other services 418 may also be specified in the task definition for the task 410.

In the example illustrated in FIG. 4, the instances in the instance group 406 are isolated from each other. Thus, the instance 404 has no communication 420 with another instance 422 in the instance group even though that instance 422 is also associated by the customer 402. Similarly, the instance 422 has no communication 428 with the instance 426 in the instance group 406, nor does the instance 426 have any communication 424 with the instance 404. Each of the instances operates as if it is alone in the instance group 406, maintaining only the communication between the task and the other services 418, the communication between the agent 414 and the container management service 416, and the communication between the task 410 and the customer 402 using the network interface 408.

Figure 5:
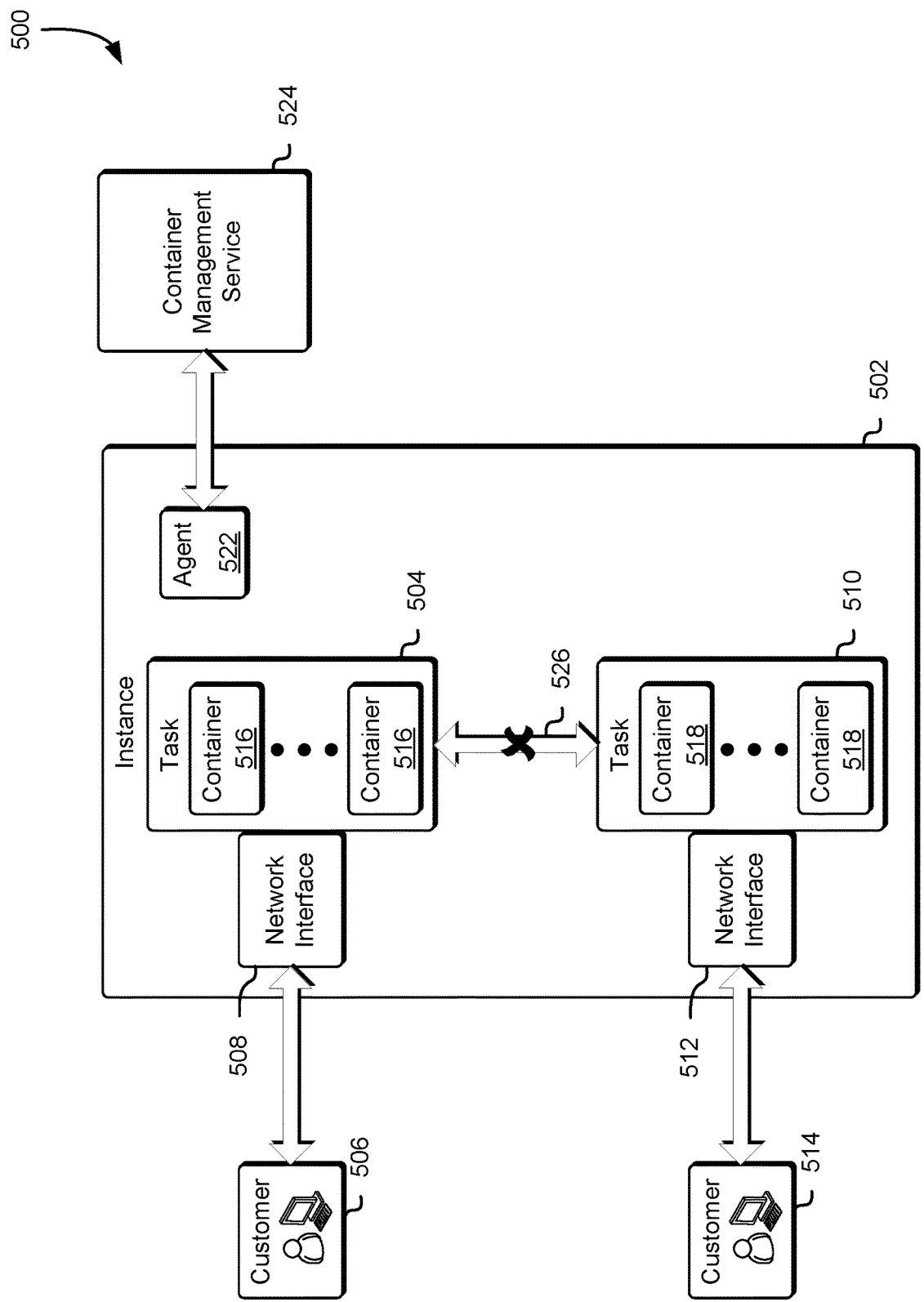
FIG. 5 illustrates an example environment where containers on a container instance are isolated from each other.

FIG. 5 illustrates an example environment 500 where containers on a container instance are isolated from each other, as described in connection with FIG. 1, and in accordance with an embodiment. In the example illustrated in FIG. 5, each task within an instance is isolated from the other tasks. An instance 502 has a task 504 and a task 510. The task 504 includes containers 516, as described above. Although not illustrated in FIG. 5, the task 504 may communicate with other services via the network interface 508, as described above. Access to the task 504 is provided to a customer 506 using the network interface 508, all as described above. Similarly, the task 510 includes containers 518 and may also communicate with other services, as described above. Access to the task 510 is provided to a customer 514 using the network interface 512, also all as described above.

Even though the task 504 and the task 510 are both running on the instance 502, and even though both are monitored by the agent 522, which provides status updates on the tasks and the instance 502 to the container management service 524, the task 504 does not communicate 526 with the task 510. This isolation (i.e., a lack of communication) between the task 504 and the task 510 may exist even in a single tenant environment, where the customer 506 and the customer 514 are the same entity. In an embodiment, the container management service 524 enforces this isolation between tasks and only allows communication between containers. This isolation between tasks may be enforced by the container management service 524 to prevent tasks from tampering with, or otherwise altering other tasks. In another embodiment, the container management service 524 enforces isolation between containers so that, for example, a container is prevented from tampering with, or altering other containers.

Figure 6:
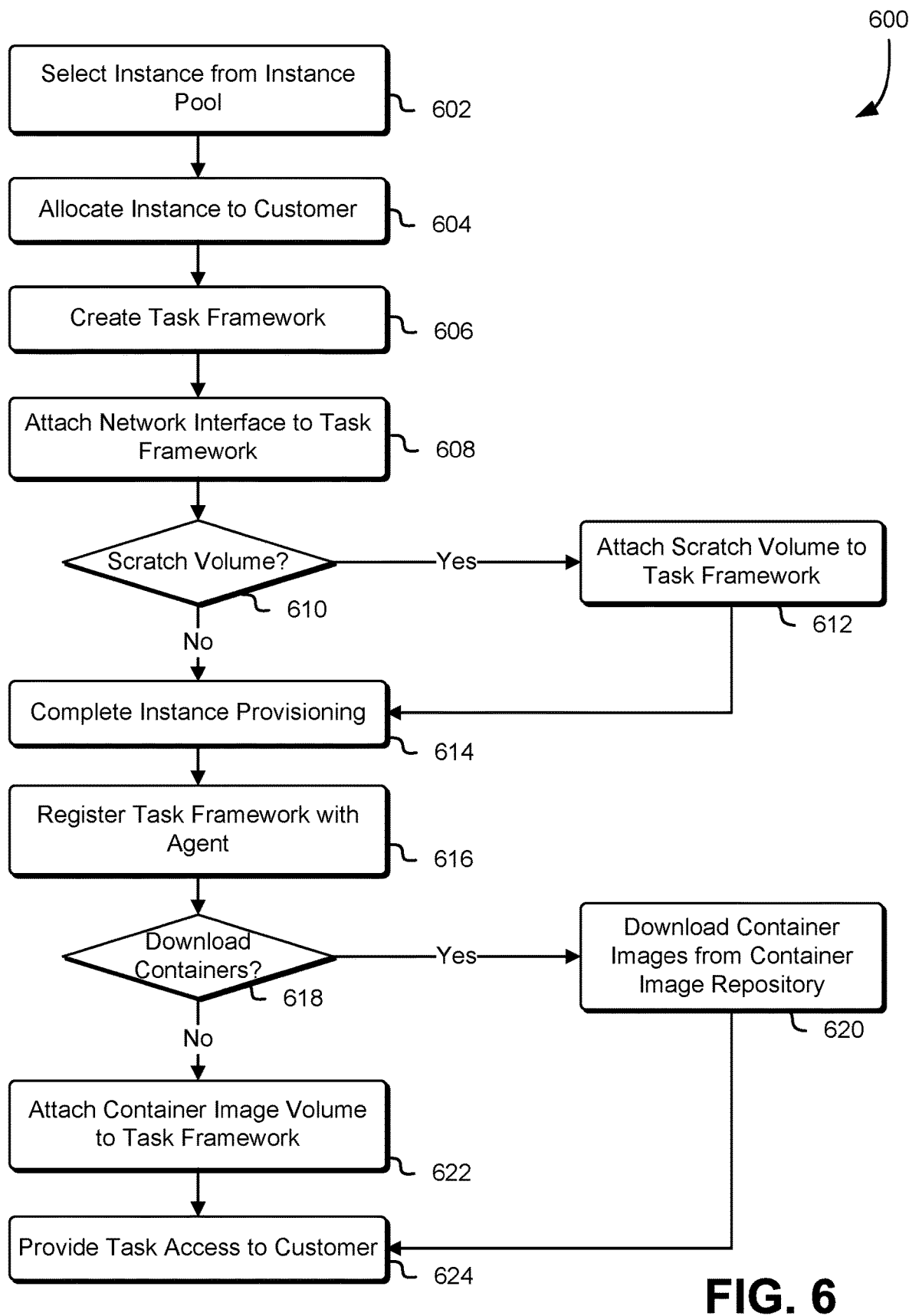
FIG. 6 illustrates an example process for instantiating and provisioning a container instance.

FIG. 6 illustrates an example process 600 for instantiating and provisioning a container instance, as described in connection with FIG. 1, and in accordance with an embodiment. A container management service, such as the container management service 104 described in connection with FIG. 1, may perform the example process 600 illustrated in FIG. 6. The container management service may first select 602 an instance from the instance pool, as described above. The container management service may next allocate 604 the instance to the customer (i.e., may assign the instance to the customer for executing tasks according to the task definition). The container management service may next create 606 the task framework. As used herein, a "task framework" is the execution environment for the task (and the associated containers). The task framework maintains the network interface associated with the task, maintains any other resources associated with the task, keeps track of the containers in the task as they are instantiated, maintains communication between the containers, maintains communications with the services described above, and connects with the instance agent for monitoring the tasks.

The container management service may then attach 608 the network interface to the task framework by, for example, instantiating a network interface and assigning the resources associated with that network interface (e.g., a hardware interface and/or a virtualization of a hardware interface, an address, software, and/or other resources associated with the network interface). The network interface may be attached to the task framework at an early point in the task instantiation so that, for example, container images may be provided to the task framework. The network interface may also be attached to the task framework at an early point in the task instantiation so that the customer can monitor the task instantiation. In an embodiment, the network interface is attached to the task framework at a later point in the task instantiation when, for example, the container instance begins executing.

The container management service may then determine 610 whether a scratch volume (also referred to herein as a "temporary volume") should be attached to the task framework. As used herein, a scratch volume is a temporary volume that the task (and the containers associated with the task) can use to store temporary data. A scratch volume is temporary in that it does not typically persist beyond the lifetime of the task and the associated containers. Although not illustrated in FIG. 6, the container management service may also determine whether to attach additional volumes (i.e., additional storage devices) to the task framework or the instance. For example, the container management service may request that a shared volume from, for example, a storage service, be shared between container instances, tasks, task frameworks, or containers where such a shared volume is attached to the instance and/or to the containers. The container management service may also request that a block storage volume from, for example, a block storage service, be shared between container instances, task frameworks, or containers and attached to the instance and/or to the containers where such a block storage volume is attached to the instance and/or to the containers.

If the container management service does determine 610 that a scratch volume should be attached to the task framework, the container management service may attach 612 the scratch volume to the task framework. The container management service may then complete 614 any operations to provision the instance, to provide the task framework, and/or to provision the associated containers with access to the services of the computing resource services provider. In an embodiment, the container management service may complete 614 any operations to provision the instance by, for example, registering the instance with one or more security groups of the computing resource service provider, completing registration and provisioning of the network interface, or connecting the containers on the instance to a container management service. Conversely, if the container management service does not determine 610 that a scratch volume should be attached to the task framework, the container management service may then complete 614 any operations to provision the instance, to provide the task framework, and/or to provision the associated containers with access to the services of the computing resource services provider, as described above.

The container management service may then register 616 the task framework with the instance agent so that, for example, the instance agent can monitor the task and/or the associated containers as described above. The container management service may next determine 618 whether to download the containers from a container repository or whether to attach a container image volume to the task framework. If the container management service does determine 618 to download the containers from a container repository, the container management service may next locate the container image repository and may download 620 container images from the container image repository, as described below, and may provide 624 access to the task to the customer by, for example, providing the customer with a locator for the instance and/or access to the network interface for the task(s) on the instance. Conversely, if the container management service does not determine 618 to download the containers from a container repository, the container management service may generate a container image volume, may attach 622 the container image volume to the task framework, as described below, and may provide 624 access to the task, to the customer.

Figure 7:
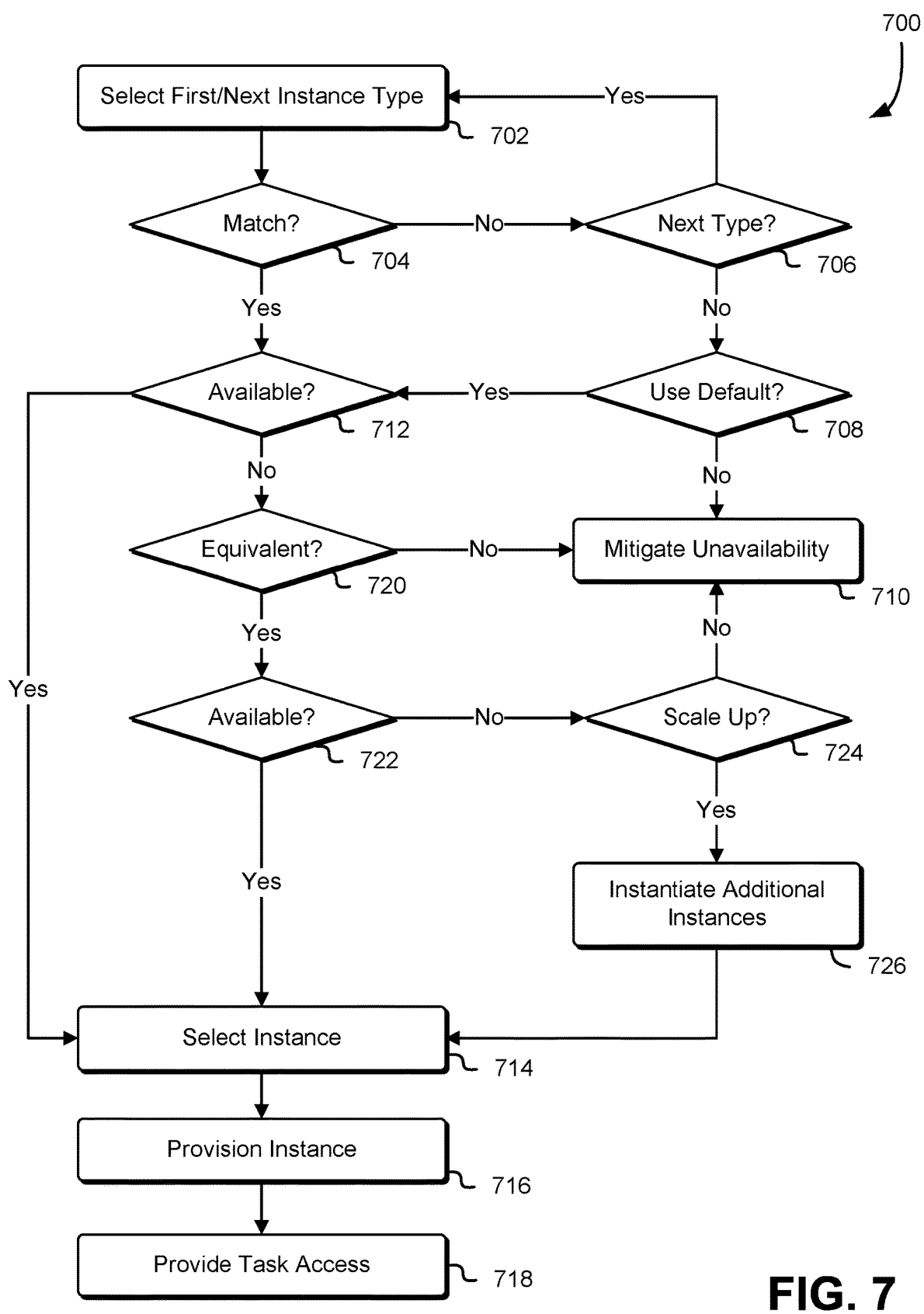
FIG. 7 illustrates an example process for selecting a suitable container instance.

FIG. 7 illustrates an example process 700 for selecting a suitable container instance, as described in connection with FIG. 1, and in accordance with an embodiment. A container management service such as the container management service 104, described in connection with FIG. 1, may perform the example process 700 illustrated in FIG. 7. In the example process illustrated in FIG. 7, a container management service may first select 702 an instance type from a set of instance types. The container management service may next determine 704 if the selected instance type is a match for the desired instance type specified in the task definition, as described above. The container management service may determine 704 that the selected instance type is a match for the desired instance type specified in the task definition if, for example, the selected instance type has sufficient resources to host the containers specified in the task definition.

If the container management service does not determine 704 that the selected instance type is a match for the desired instance type specified in the task definition, the container management service may determine 706 if there is a next type available to evaluate. If the container management service does determine 706 that there is a next type available to evaluate, the container management service may select 702 the next instance type and determine 704 whether that type is a match. If the container management service does not determine 706 that there is a next type available to evaluate, the container management service may, in some embodiments, determine 708 whether a default instance type may be used to execute the containers for the tasks in the task definition. If the container management service does determine 708 that a default instance type may be used to execute the containers for the tasks in the task definition, the container management service may determine 712 whether that default instance type is available (i.e., that the default instance type is running and available in the instance pool). Similarly, if the container management service does determine 704 that the selected instance type is a match for the desired instance type specified in the task definition, the container management service may determine 712 whether that instance type is available (i.e., that an instance of the instance type is running and available in the instance pool).

If the container management service does not determine 708 that a default instance type may be used to execute the containers for the tasks in the task definition, the container management service may perform 710 one or more unavailability mitigation operations, as described above in connection with FIG. 3.

If the container management service does determine 712 that an instance of the requested type is available (i.e., that an instance of the instance type is running and available in the instance pool), the container management service may select 714 the instance, provision 716 the instance, and provide 718 the access to the task, as described above. Conversely, if the container management service does not determine 712 that an instance of the requested type is available (i.e., that there is no instance of the instance type running and available in the instance pool), the container management service may determine 720 whether there are any equivalent instance types that may be selected to host the containers associated with the task, as described above.

If the container management service does not determine 720 that there are any equivalent instance types that may be selected to host the containers associated with the task, the container management service may perform 710 one or more unavailability mitigation operations, including as described above.

Conversely, if the container management service does determine 720 that there are equivalent instance types that may be selected to host the containers associated with the task, the container management service may determine 722 whether an equivalent instance type is available (i.e., that an instance of the equivalent instance type is running and available in the instance pool). If the container management service does determine 722 that an instance of the equivalent instance type is available (i.e., that an instance of the equivalent instance type is running and available in the instance pool), the container management service may select 714 the instance, provision 716 the instance, and provide 718 access to the task as described above. Conversely, if the container management service does not determine 722 that an instance of the requested type is available (i.e., that there is no instance of the equivalent instance type running and available in the instance pool), the container management service may determine 724 whether to scale up to provide additional instances by, for example, instantiating one or more new instances of the instance type in the instance pool. For example, if the container management service cannot obtain and provision any instances of, for example, type "A" because there are no available instances of type "A" in the instance pool, the container management service may instantiate one or more new instances of type "A" in the instance pool.

The additional instances may be of an instance type with a set of performance characteristics that satisfies the set of parameters for instantiating the container, as determined by the task definition. The instance may also be of an equivalent instance type, where an equivalent instance type has a set of performance characteristics that satisfies a minimum number of parameters of the set of parameters for instantiating the container on an instance of the instance type, where the minimum number is specified in the container description. For example, the set of parameters for instantiating a container on an instance may specify parameters for CPU (i.e., a CPU specification for the instance), memory (i.e., a memory specification for the instance), or network bandwidth (i.e., a network bandwidth specification for the instance), but the container description may specify that only two of these (e.g., memory and network bandwidth) are strictly necessary. Thus, an equivalent instance type that satisfies two parameters (i.e., that satisfies a minimum number of parameters of the set of parameters for instantiating the container on an instance of the instance type) may be used instead.

If the container management service does not determine 724 to scale up to provide additional instances, the container management service may perform 710 one or more unavailability mitigation operations including as described above. Conversely, if the container management service does determine 724 to scale up to provide additional instances, the management service may instantiate 726 additional instances and may select 714 an instance from the additional instances, provision 716 the instance, and provide 718 access to the task, as described above.

Figure 8:
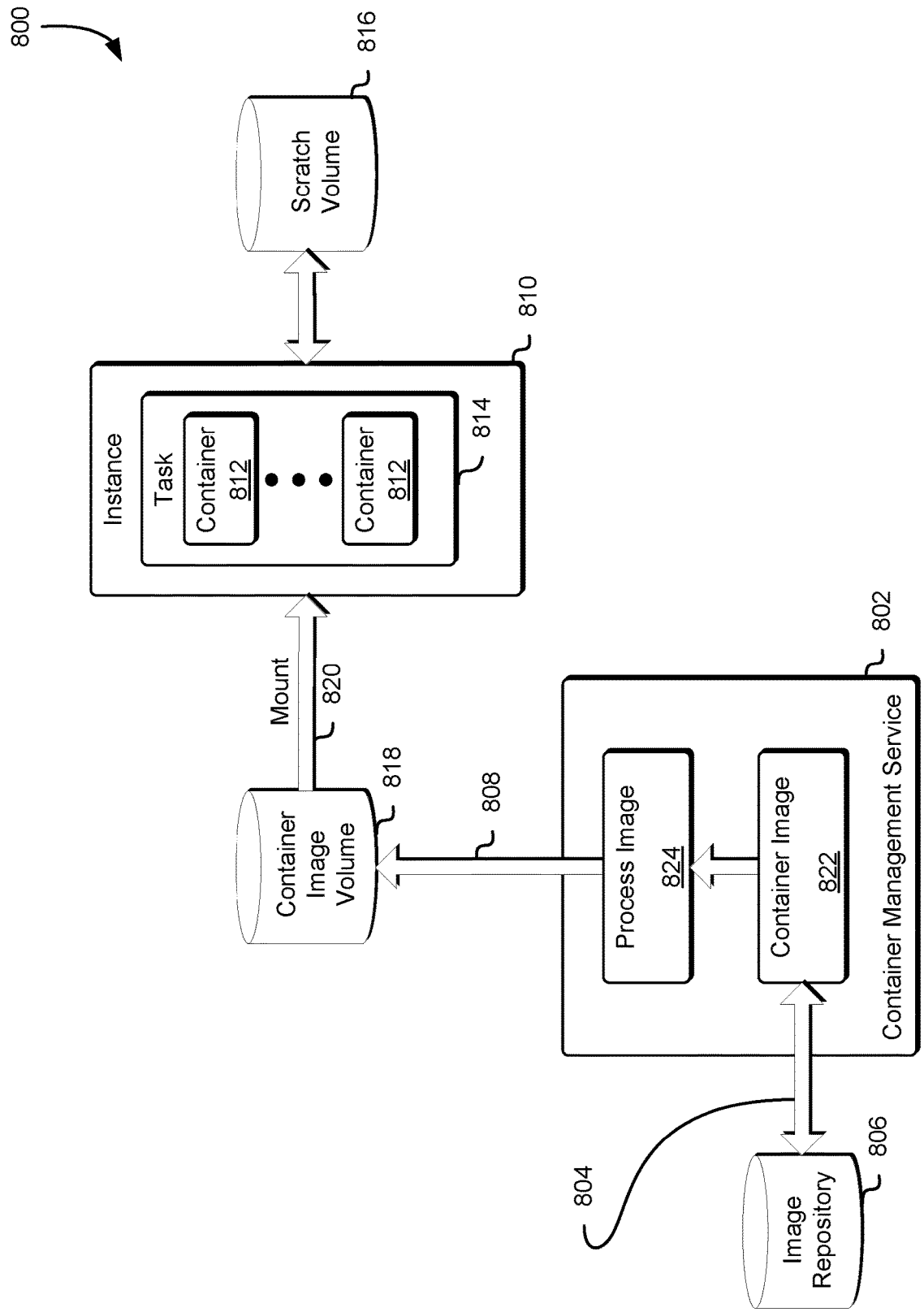
FIG. 8 illustrates an example environment where a container within a container instance is instantiated using a container management service.

FIG. 8 illustrates an example environment 800 where a container within a container instance is instantiated using a container management service, as described in connection with FIG. 1 and in accordance with an embodiment. In the example illustrated in FIG. 8, a container management service 802 may retrieve 804 a container image 822 from an image repository 806. The container image 822 is an image of a container that may be used to instantiate the container. The container image 822 contains the software and data needed to operate the container. So, for example, the container image 822 may contain an operating system for the container, drivers for the container to interface with the container instance, software that can be executed, data, and one or more scripts that, when executed, cause the container to perform actions associated with the task. The image repository 806 is a searchable repository of such container images.

The container management service 802 may then process 824 the container image before the container image is copied 808 to a container image volume 818. The container management service 802 may process 824 the container image by, for example, encrypting the container image or compressing the container image. The container image volume 818 is a storage device that is either physical or virtual and that contains one or more container images.

The container image volume 818 may be mounted 820 (i.e., operationally attached to the instance using the operating system of the instance) to an instance such as the instance 810. The container image volume 818 can then be used by the instance 810 to instantiate the containers 812 associated with the task 814. Although not illustrated in FIG. 8, the task 814 may have a network interface, as described above. It should be noted that the container image volume 818 may be separate from the scratch volume 816 (or temporary volume) described above. In an embodiment, the container image volume 818 is mounted on the instance read-only (i.e., so that the instance can only read from the container image volume 818).

Figure 9:
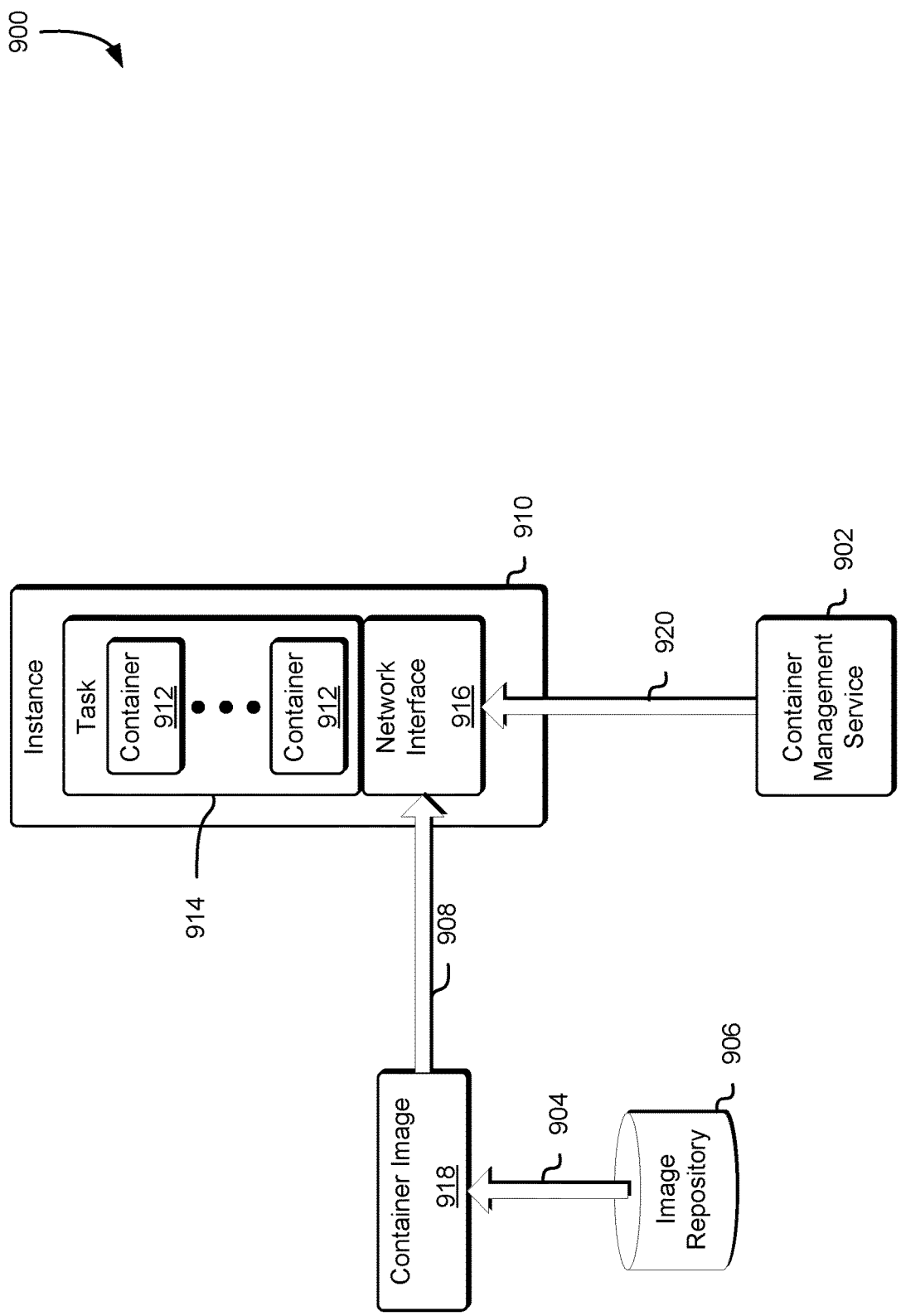
FIG. 9 illustrates an example environment where a container within a container instance is instantiated using a container management service.

FIG. 9 illustrates an example environment 900 where a container within a container instance is instantiated using a container management service, as described in connection with FIG. 1, and in accordance with an embodiment. In the example illustrated in FIG. 9, the container management service 902 may direct 920 the instance 910 to retrieve 904 a container image 918 from an image repository 906. The container management service 902 may direct 920 the instance 910 to retrieve 904 a container image 918 from an image repository 906 by, for example, providing a resource locator of the container image 918 the instance 910 using the network interface 916. The image repository 906 may provide 908 the container image 918 to a task 914 running on an instance 910 using a network interface 916, as described above. In embodiment, the network interface 916 is different from the network interface used by the customer to communicate with the task, as described above. The container image 918 may then be used by the instance 910 to instantiate one or more containers 912 associated with the task 914. Although not illustrated in FIG. 9, the instance 910 may have a scratch volume (or temporary volume), as described above.

Figure 10:
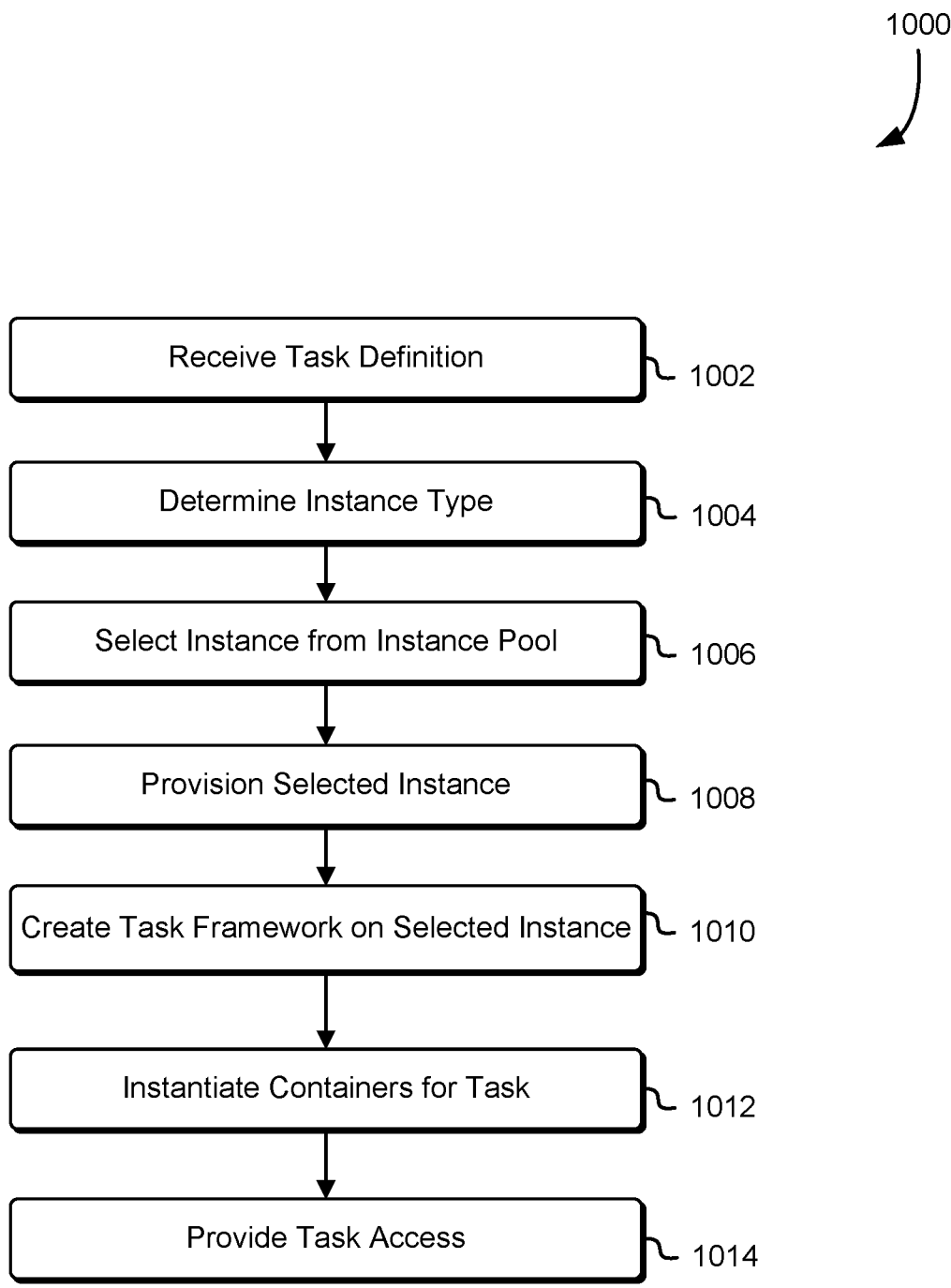
FIG. 10 illustrates an example process for instantiating container instances using a container instance manager.

FIG. 10 illustrates an example process 1000 for instantiating container instances using a container instance manager, as described in connection with FIG. 1, and in accordance with an embodiment. A container management service, such as the container management service 104 described in connection with FIG. 1, may perform the example process 1000 illustrated in FIG. 10. The container management service may first receive 1002 a task definition and, based at least in part on that task definition, may determine 1004 the instance type or types that are needed to execute the task. The container management service may then select 1006 one or more instances of the needed instance types from the instance pool and may provision 1008 the selected instances. The container management service may then create 1010 the task on the instance (i.e., may create the task framework as described above), may instantiate 1012 the containers for the task, and may finally provide 1014 access to the task to the customer.

Figure 11:
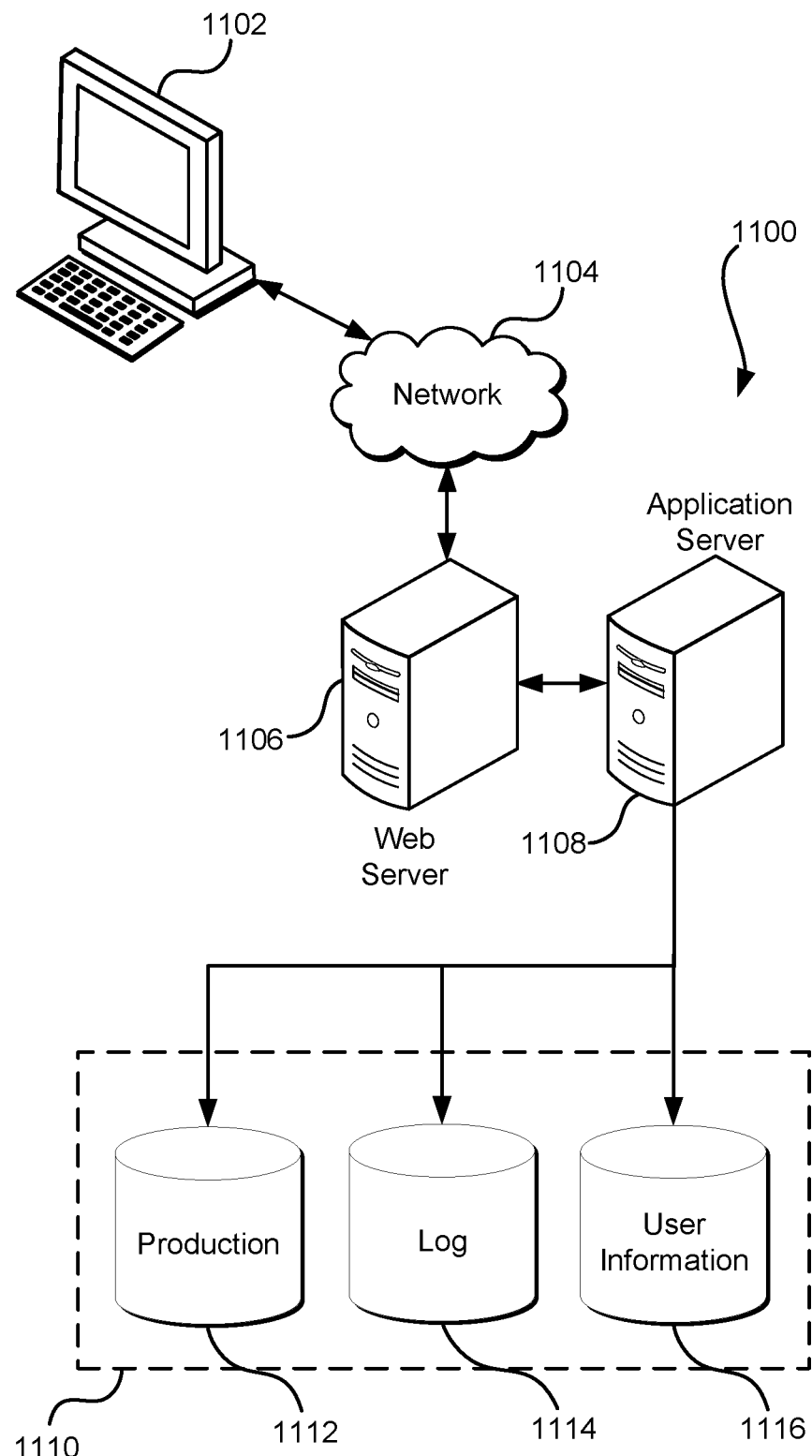
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system illustrated in the example environment 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory, as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a container management service, a task definition for a task, the task definition including a container description, the container description including a set of parameters for instantiating a container, the set of parameters including a number of central processing units (CPUs) and an amount of memory for the container;
   determining, based at least in part on the container description, an instance type usable for instantiating the container, the instance type having a set of performance characteristics that satisfy the set of parameters for instantiating the container;
   upon determining that there are no instances of the instance type available, determining a second instance type having a second set of performance characteristics that exceeds the set of parameters for instantiating the container;
   selecting a running instance of the second instance type from an instance pool, the instance pool including a plurality of running instances that are available to host containers, wherein the running instance comprises a running virtual machine instance configured to run and launch containers, and wherein the running instance is not associated with a task or a container and is available to be assigned;
   instantiating the container on the running instance; and
   providing access to the task to a customer associated with the task, the access allowing the customer to interact with the task.

2. The computer-implemented method of claim 1, wherein the task definition indicates that the container is to communicate with a service and the method further comprises: configuring a network interface associated with the running instance to enable connectivity to the service.

3. The computer-implemented method of claim 1, wherein instantiating the container includes mounting a container image volume on the running instance, the container image volume having stored thereon a container image specified in the task definition.

4. The computer-implemented method of claim 1, wherein instantiating the container includes:
retrieving a container image from a container repository using a network interface associated with the running instance; and
instantiating the container using the container image.

5. A system, comprising at least one computing device configured with processors and memory, the memory including instructions that upon execution cause the system to:
determine a first instance type that has a set of performance characteristics that satisfy a set of parameters for instantiating a container obtained from at least information in a task definition associated with a task;
determine a second instance type, which is different from the first instance type, that satisfies or exceeds the set of parameters for instantiating the container;
select an instance of the second instance type from an instance pool, the instance pool including a set of running instances, each instance of the set of running instances having a corresponding instance type, wherein the instance is not associated with a container and is available to be assigned, the instance comprising a running computing system instance configured to run and launch containers and, the instance assigned to a customer associated with the container; and
instantiate the container on the instance based at least in part on the task definition.

6. The system of claim 5, wherein the instructions that cause the system to select the instance from the instance pool further include instructions that, upon execution cause the system to:
analyze the set of parameters obtained from the task definition to generate a set of performance specifications for the instance, wherein the set of performance specifications for the instance includes at least one of: a CPU specification for the instance, a memory specification for the instance, or a network bandwidth specification for the instance; and
select the instance from the instance pool based at least in part on the instance including resources that satisfy the set of performance specifications.

7. The system of claim 6, wherein the set of performance specifications for the instance includes a hardware requirement for the instance, the hardware requirement for the instance specifying at least one of: a field-programmable gate array requirement, an application specific integrated circuit requirement, a hardware security module requirement, or a graphics processing unit requirement.

8. The system of claim 5, wherein the task definition describes a set of containers, each container of the set of containers corresponding to one or more container descriptions.

9. The system of claim 5, wherein the system provisions the instance by attaching a network interface to the instance to connect the instance to a virtual network of the customer.

10. The system of claim 5, wherein the system provisions the instance by attaching a temporary volume to the instance, the temporary volume usable by the container to read and write data while the container is running.

11. The system of claim 5, wherein an instance agent of the instance monitors the instance and provides one or more health metrics of the instance to a container management service provided by a computing resource service provider.

12. The system of claim 11, wherein the instance agent monitors the containers for one or more resource usage metrics, the one or more resource usage metrics usable to determine a resource cost associated with the container.

13. A non-transitory computer-readable storage medium having stored thereon executable instructions that, as a result of being executed by one or more processors of a computer system, cause the computer system to at least:
determine an instance type such that the instance type satisfies a set of parameters for instantiating a container on an instance of the instance type, the set of parameters for instantiating the container included in a container description of the container;
determine a second instance type, which is different from the instance type, that satisfies or exceeds the set of parameters for instantiating the container;
select an instance of the second instance type from an instance pool, the instance pool including a set of running instances, wherein the instance is not associated with a task and is available to be assigned to a customer, wherein the instance comprises a running computing system instance configured to run and launch containers;
cause the instance to be assigned to a first customer associated with the container; and
instantiate the container on the instance corresponding to the container description.

14. The non-transitory computer-readable storage medium of claim 13, wherein the instructions that cause the computer system to determine the second instance type further comprise instructions that, as a result of being executed by the one or more processors, cause the computer system to upon determining that there are no instances of the instance type in the instance pool, determine the second instance type based at least in part on the set of parameters for the second instance type, the second instance type having a set of performance characteristics that satisfy or exceed the set of parameters for instantiating the container on an instance of the instance type.

15. The non-transitory computer-readable storage medium of claim 13, wherein the instructions that cause the computer system to determine the second instance type that satisfy or exceed the set of parameters for instantiating the container further comprise instructions that, as a result of being executed by the one or more processors, cause the computer system to: determine that the set of parameters for instantiating the container specify an underprovisioned instance type; and
determine the second instance type such that the second instance type exceeds the set of parameters.

16. The non-transitory computer-readable storage medium of claim 13, wherein the instructions that cause the computer system to select the instance of the second instance type from the instance pool further include instructions that, as a result of being executed by the one or more processors, cause the computer system to, upon determining there are no instances of the second instance type in the instance pool:
instantiate one or more new instances of the instance type or the second instance type in the instance pool; and
select the instance from the one or more new instances of the instance type or the second instance type.

17. The non-transitory computer-readable storage medium of claim 13, wherein the instance includes an instance agent that communicates with a container management service provided by a computing resource services provider the instance agent configured to apply security updates to the instance, the security updates received from the container management service.

18. The non-transitory computer-readable storage medium of claim 13, wherein the instructions that cause the computer system to determine the second instance type further comprise instructions that, as a result of being executed by the one or more processors, cause the computer system to:
   determine that the set of parameters for instantiating the container specify an overprovisioned instance type; and
   determining the second instance type such that the second instance type corresponds to a second set of parameters that is different than the set of parameters.

19. The non-transitory computer-readable storage medium of claim 13, wherein the instructions that cause the computer system to provision the instance further include instructions that, as a result of being executed by the one or more processors, cause the computer system to attach a network interface to the instance, the network interface configured to allow communication with the container via a web services interface.

20. The non-transitory computer-readable storage medium of claim 13, wherein the instructions further comprise instructions that, as a result of being executed by the one or more processors, cause the computer system to return the instance to the instance pool as a result of the container being terminated.

* * * * *